United States Patent [19]

Baum

[11] 4,200,597
[45] Apr. 29, 1980

[54] DEVICE FOR REVOLVING LIQUIDS AND SUPPLYING GAS THERETO

[75] Inventor: Engelbert Baum, Vienna, Austria

[73] Assignee: Alfa-Laval Stalltechnik GmbH, Wien, Austria

[21] Appl. No.: 935,002

[22] Filed: Aug. 18, 1978

[30] Foreign Application Priority Data

Aug. 26, 1977 [AT] Austria ................................ 6215/77

[51] Int. Cl.² .............................................. B01F 3/04
[52] U.S. Cl. ...................................... 261/87; 210/219; 210/220; 416/176; 416/234
[58] Field of Search ................ 261/87, 91, 93, 121 R, 261/123, 124; 416/176, 234; 210/219, 220; 209/169, 170

[56] References Cited

U.S. PATENT DOCUMENTS

| 41,024 | 12/1863 | Smith | 261/87 X |
|---|---|---|---|
| 1,383,881 | 7/1921 | Thomas | 261/87 |
| 1,445,935 | 2/1923 | Daman et al. | 261/87 X |
| 1,579,355 | 4/1926 | Greenawalt | 261/87 X |
| 1,830,985 | 11/1931 | Dreier | 416/234 X |
| 2,187,746 | 1/1940 | Lefevre | 261/87 |
| 3,274,075 | 9/1966 | Kersting | 261/87 X |
| 3,400,051 | 9/1968 | Hofschneider | 261/87 X |
| 3,584,840 | 6/1971 | Fuchs | 210/220 X |
| 3,782,701 | 1/1974 | Hunt | 261/87 X |
| 3,975,469 | 8/1976 | Fuchs | 261/87 |

FOREIGN PATENT DOCUMENTS

| 2439683 | 3/1975 | Fed. Rep. of Germany | 416/176 |
|---|---|---|---|
| 569143 | 5/1945 | United Kingdom | 261/87 |

Primary Examiner—Richard L. Chiesa
Attorney, Agent, or Firm—Cyrus S. Hapgood

[57] ABSTRACT

A driven hollow shaft carries propeller means in the form of a screw-shaped vane which at its lower edge widens to a chamber communicating through a channel with the interior of the hollow shaft and having an outlet opening through which gas supplied through the hollow shaft is discharged into a liquid in which the propeller means are immersed. The chamber is formed by two downwardly diverging screw-shaped surfaces of the vane and has a V-shaped cross section with the apex pointing outwardly from the driven shaft.

2 Claims, 3 Drawing Figures

DEVICE FOR REVOLVING LIQUIDS AND SUPPLYING GAS THERETO

The present invention relates to devices for supplying gas to liquids, especially manure, sewage containing bacteria, or the like, and revolving the liquids, comprising a driven hollow shaft, carrying a propeller means, provided with gas outlet openings, through which gas may be supplied to the liquids, the propeller means comprising at least one screw-shaped vane. Devices of this type are known in the art, and are provided with a gas outlet opening at the lower end of the hollow shaft, or at the side of the hollow shaft. The disadvantage of such devices is, that only relatively small amounts of air are sucked into the revolved liquid through the hollow shaft.

The object of the present invention is to overcome this disadvantage of the known devices, by providing a device, where the screw-shaped vane at its lower edge widens to a chamber, which is connected to the hollow shaft via a channel, and which forms, in tangential direction, an outlet opening. By providing the outlet openings in tangential direction, a surprisingly large amount of air is sucked into the liquid by the suction action of the revolving screw-shaped vanes, through the hollow shaft into the chamber, and from this via the outlet openings into the liquid. In a preferred embodiment, the chamber is formed from two downwards diverging screw-shaped surfaces, and shows a V-formed cross section, with the apex pointing outwards. As the circumferential speed of the screw-shaped vane is greatest at the zone of the smallest outlet cross section, the largest amount of air is discharged at high speed at the outer edges of the propeller, wherefrom it can also flow into the outer zone of the tank, that holds the liquid. A very high rate of air suction is obtained, if the upper and lower edges, running radially, cross each other at the outlet opening, the lower edge in the outer zone, seen in the axial direction of the hollow shaft, extending beyond the upper edge.

BRIEF DESCRIPTION OF THE DRAWING FIGURES

The invention is described more in detail below with reference to the accompanying drawing, in which FIG. 1 is an end view of a propeller according to the present invention, viewed toward the free end of the hollow shaft;

DESCRIPTION OF THE PREFERRED EMBODIMENT

Figure 1:
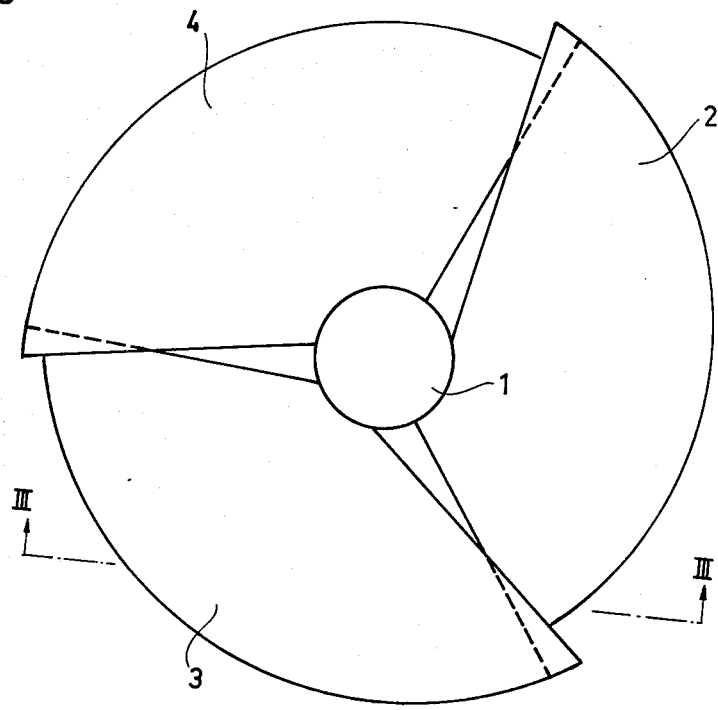
Figure 3:
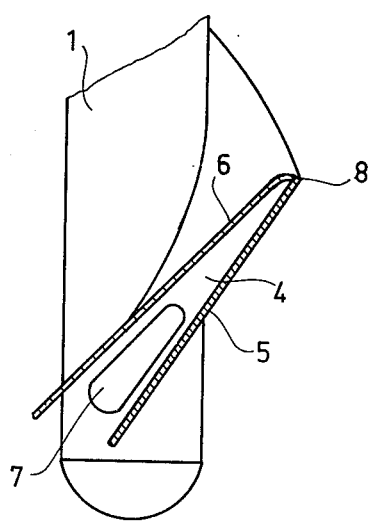
FIG. 3 is a sectional view on line III—III in FIGS. 1 and 2.
Figure 2:
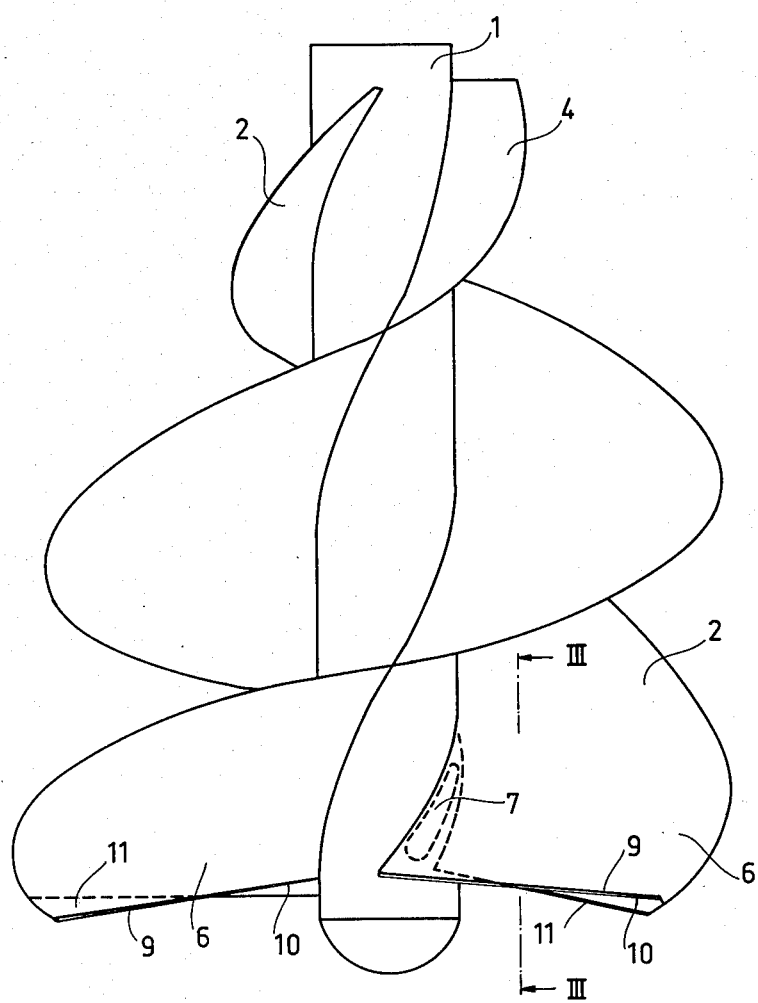
FIG. 2 is an elevational view of a propeller shown in FIG. 1.

To a hollow shaft 1 three screw-shaped vanes 2, 3 and 4 are attached by welding. In the lower zone all three screw-shaped vanes 2, 3,4 divide into the downwards diverging vane-parts 5, 6, which form a chamber 4. The chamber 4 is connected to the inner part of hollow shaft 1, via a connecting channel 7. The cross section of chamber 4 is V-formed, the apex 8 pointng outwards. The outlet opening 10 of every chamber 4 is limited by an upper and a lower edge 9, 11, which edges cross each other, seen in the axial direction of hollow shaft 1, the lower edge 11 in the outer zone extending beyond the upper edge. As the circumferential speed of the vane is greatest in the zone of apex 8, and the smallest cross section of the outlet is prevailing here, the air, that is sucked from hollow shaft 1, is discharged in the zone of apex 8 at especially high speed.

I claim:

1. A device for supplying gas to a liquid and revolving the liquid, especially manure, sewage containing bacteria, or the like, said device comprising a driven hollow shaft which is generally vertical, and at least one screw-shaped vane carried by said shaft and forming a propeller means adapted to be immersed in said liquid, said vane having a lower edge portion which widens to a chamber, said shaft having a channel through which said chamber communicates with the interior of the hollow shaft, said chamber having at its lower portion an outlet opening positioned to discharge into said liquid a gas supplied through said shaft interior and said channel into said chamber, said vane having two downwardly diverging screw-shaped surfaces forming said chamber, said chamber having a V-shaped cross section with the apex thereof pointing outwardly from the hollow shaft.

2. The device of claim 1, in which said downwardly diverging surfaces terminate in upper and lower edges, respectively, which define said outlet opening, said edges extending generally radially from the shaft and crossing each other at the outlet opening, said lower edge extending radially outward beyond the upper edge, as viewed in the axial direction of the hollow shaft.

* * * * *